Sept. 12, 1961    M. B. WILCOX    2,999,706
TUBE LOCK
Filed May 6, 1959
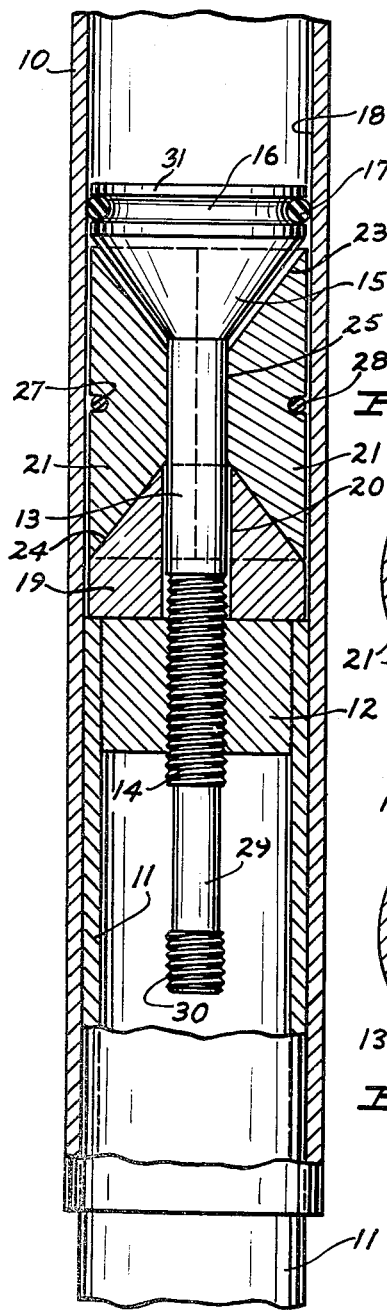
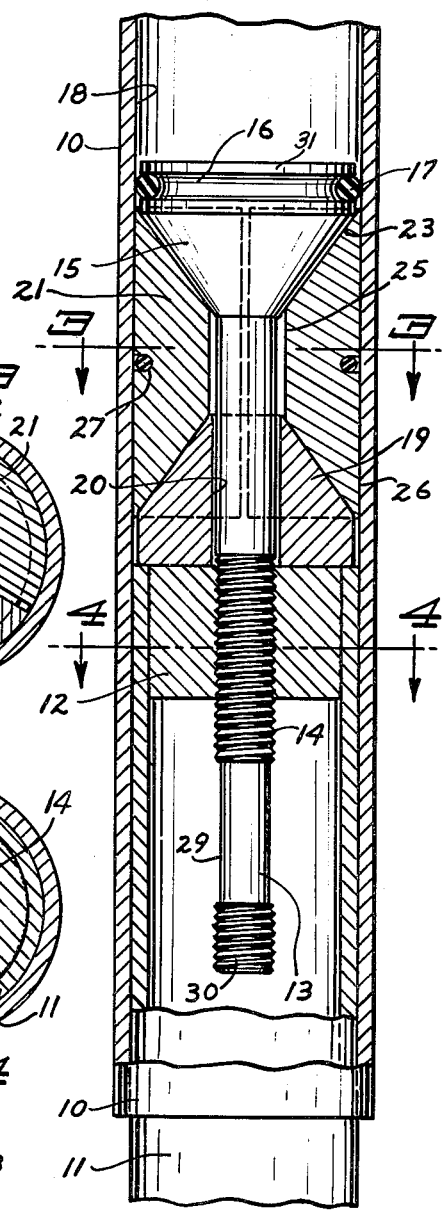
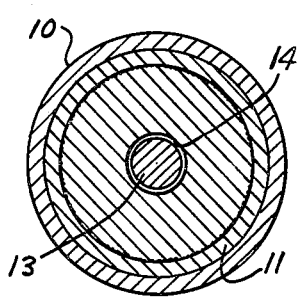
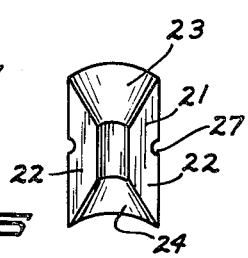
INVENTOR.
MERRILL B. WILCOX
BY Braddock and Braddock
ATTORNEYS

United States Patent Office 2,999,706
Patented Sept. 12, 1961

2,999,706
TUBE LOCK
Merrill B. Wilcox, Minneapolis, Minn., assignor to Aladdin Manufacturing Company, Minneapolis, Minn., a corporation of Minnesota
Filed May 6, 1959, Ser. No. 811,337
1 Claim. (Cl. 287—58)

This invention has relation to a mechanism for locking two telescoping tubes with respect to each other. In a device made according to the present invention, rotation of inner and outer telescoping tubes with respect to each other in the direction of advancement of a right hand screw, for example, will cause the tube locking mechanism to fixedly position said tubes against the horizontal movement with respect to each other. Rotation of the two tubes in an opposite direction will cause the tube locking mechanism to become loosened so that the tubes will slide freely one inside of the other.

As shown herein, the tube locking mechanism of the invention includes a stud which is threadably mounted in an end plug in the end of the inner tube. The outer end of this stud is integral with an outwardly diverging first conical cam. This cam includes a cylindrical portion at a side thereof opposite the integral stud. The cylindrical portion is of diameter slightly less than the inside diameter of the outer tube and is provided with a circumferential annular groove therein for the reception of an O-ring. This O-ring is of a size so that it will be in sliding frictional contact with the inner wall of the outer tube.

A second conical cam is situated to be freely slidable on the stud between the inner tube end plug and the first conical cam.

Inasmuch as the O-ring in the annular groove in the first cam tends to hold this cam and consequently the stud in fixed angular relationship to the outer tube, rotation of the inner tube with respect to the outer tube can cause the inner tube to be advanced toward the first conical cam along the threads on the stud. By providing a plurality of properly shaped wedges, therefore, between the two camming surfaces of the first and second cams, movement of the cams toward each other can cause a forcing of these wedges out against the inner wall of the outer tube to firmly lock the two cams and all of the wedges against that wall of that tube thus to effectively prevent the longitudinal movement of the tubes with respect to each other.

Conversely, rotation of the inner and outer tubes in an opposite direction will cause the inner tube and second cam to move in direction away from the first cam to relieve the pressure on the wedges. When this happens, the tubes can be slid freely longitudinally with respect to each other. The only deterrent to this movement will then be the friction between the tubes and the slight friction of the O-ring on the inner wall of the outer tube.

In the drawings,

FIG. 1 is a longitudinal sectional view of a tube lock mechanism of the present invention as it would appear in association with inner and outer telescoping tubes when these tubes are freely longitudinally slidable with respect to each other;

FIG. 2 is a longitudinal sectional view of the device of FIG. 1 but with the parts as they will appear when the inner and outer tubes are locked against longitudinal movement with respect to each other;

FIG. 3 is a transverse sectional view taken on the line 3—3 in FIG. 2;

FIG. 4 is a transverse sectional view taken on the line 4—4 in FIG. 2; and

FIG. 5 is a perspective view of one of a plurality of wedges used between the first and second conical cams of the present invention.

Referring now to the drawings and to the numerals of reference thereon, an outer tube 10 and an inner telescoping tube 11 are positioned one inside the other to be normally freely longitudinally moveable with respect to each other. In the embodiment of the invention as shown, inner tube 11 is provided with an internally threaded end plug 12 which is fixedly secured thereto. A stud 13 is threadably mounted in end plug 12 through the instrumentality of operating thread portion 14. Integral with an end of said stud and in spaced relation from the end of said inner tube 11 is a first conical cam 15. The conical surface of this cam diverges in direction away from said inner tube and is provided with a cylindrical portion or head 31 having a groove 16 around the outer periphery thereof. An O-ring 17 is situated in the groove 16 to have frictional contact with said first conical cam and with an interior surface 18 of the outer tube 10.

A second conical cam 19 has an opening 20 therethrough for the free passage of the stud 13. This second conical cam is situated in adjacent contacting relation to the end of said inner tube 11, and its conical surface converges inwardly toward said first cam.

Between the conical camming surfaces of said first and second cams are located a plurality (three as shown) of wedges 21. Each of these wedges is constituted as a segment of a cylinder bounded by planes extending radially outwardly from an axis of said cylinder. Surfaces of each of these wedges defining such radially extending planes are designated 22.

Each of the wedges 21 is further defined by a surface 23 constituted as a conical segment having a shape to match with the conical surface of the first cam 15. A similar conical surface 24 on each of the wedges 21 is shaped to exactly conform to the conical surface of the second cam 19. An inner cylindrical surface 25 of each wedge is of dimension to approximate the outer diameter of the stud 13, while an outer cylindrical surface 26 of each of said wedges matches the inner surface 18 of the outer tube 10.

As an aid in retaining the wedges in association with the remainder of the tube lock mechanism when this mechanism is outside of the outer tube 10, a groove 27 may be provided in each of the wedges 21. An O-ring 28 may be situated in said grooves 27 to hold the wedges around the stud 13 when they are not inside of the outer tube 10. Preferably this O-ring, when in the groove 27, will be in clearing relation to the outer cylindrical surface 26 of the wedges.

As an aid in discouraging the rotation of the two tubes with respect to each other to the point that the stud 13 becomes completely disassembled from the end plug 12, a cut-away portion 29 is provided on the stud. This portion is at least slightly longer than the longitudinal dimension of the end plug 12 so that if the tubes are rotated with respect to each other to the point that the end plug is no longer in contacting relationship to the working threads 14, the interior or inner tube 11 will "feel loose" with respect to the tube locking mechanism and further rotation will not be made unless it is desired to completely remove the inner tube 11 from the tube locking mechanism and the outer tube. In order to accomplish this complete removal, the inner tube will be held in downwardly bearing relationship against a further threaded portion 30 of the stud 13.

*Operation*

The frictional contact of the O-ring 17 with the groove 16 of the first conical cam and with the interior surface 18 of the outer tube 10 will tend to maintain the first conical cam and therefore the stud 13 in fixed angular relationship to the outer tube 10. Rotation of the inner tube 11 and consequently the plug 12 therein will cause the threads 14 on the stud 13 to move through this threaded end plug longitudinally depending upon the direction of rotation of the tubes with respect to each other.

With the parts positioned as shown in FIG. 1, the inner tube 11 will be rotated with respect to the outer tube 10 to cause the working thread 14 of the stud 13 to move in downward direction through the threads in the end plug 12 to cause the first conical cam 15 to move toward the second conical cam 19. This rotation will be continued until the conical surfaces 23 of each of the wedges 21 are in contact with the first conical cam and until the conical surfaces 24 of said wedges are in contact with the second conical cam 19. Subsequent rotation of the inner tube will cause the wedges 21 to move radially outwardly from the stud under the urging of the first and second cams until the outer cylindrical surfaces 26 are in contact with the inner surface 18 of the outer tube 10.

As this inner tube is still further rotated, the wedges 21 will be wrung tightly against the cams and consequently against the inner surface 18 of the outer tube 10 to the point where further rotation of the tubes with respect to each other in the same direction is impossible. At this point, there will be no possibility of longitudinal movement of one tube with respect to the other. The two telescopic tubes will, therefore, act as a single tube of the height to which they have been locked until they are rotated with respect to each other in opposite directions.

When this opposite rotation is made, the friction of the O-ring 17 against the first conical cam and the interior wall 18 of the outer tube 10 will be augmented by the wedging action of all of the wedges 21 tending to hold the stud against the rotation. The inner tube 11, therefore, will rotate with respect to the outer tube without initial rotation of the remainder of the tube locking means. The end plug 12 will, therefore, move along the thread 14 of the stud in direction away from the first conical cam, and this will allow the second conical cam to move in the same direction to release the wedges and to allow the tubes to move freely in longitudinal direction with respect to each other.

What is claimed is:

Mechanism for locking outer and inner telescoping tubes against longitudinal movement with respect to each other including a plug fixedly mounted in a first end of said inner tube to have position inside said outer tube; a stud concentric with said inner tube and threadably mounted in said plug; a first conical cam integral with said stud and converging toward said plug; a friction member mounted on said first conical cam to tend to hold said first conical cam and stud against angular displacement with respect to said outer tube; a second conical cam surrounding said stud between said first end of said inner tube and said first conical cam and converging toward said first conical cam; a plurality of wedges between said first and second conical cams, each wedge having a surface adjacent, concentric with and in matching relationship to a portion of an inner surface of said outer tube, a surface adjacent, concentric with and in matching relationship to a portion of said first conical cam, and a surface adjacent, concentric with and in matching relationship to a portion of said second conical cam; a retaining member constituted as an integral extension of said stud at an end thereof opposite said first conical cam; said retaining member consisting of a shank integral with and extending outwardly from a threaded portion of said stud, and a second threaded portion integral with said shank; and said shank being of dimension to pass freely through said plug and of length greater than that of a threaded portion of said plug in which said stud is normally threadably mounted.

References Cited in the file of this patent
UNITED STATES PATENTS

| | | |
|---|---|---|
| 617,831 | Irish et al. | Jan. 17, 1899 |
| 1,058,454 | Moores | Apr. 8, 1913 |
| 2,421,181 | Batchelder | May 27, 1947 |
| 2,444,119 | Thorn et al. | June 29, 1948 |
| 2,784,013 | Groen | Mar. 5, 1957 |
| 2,840,402 | Hassel | June 24, 1958 |